United States Patent [19]

Sugeta et al.

[11] Patent Number: 5,550,447

[45] Date of Patent: Aug. 27, 1996

[54] PULSE GENERATING SYSTEM RESPONDING TO INSTRUCTION PULSES FOR GENERATING DRIVING PULSES FOR DIVING MOTOR

[75] Inventors: Naoki Sugeta; Hiroshi Tsuyuguchi, both of Musashino, Japan

[73] Assignee: TEAC Corporation, Japan

[21] Appl. No.: 349,500

[22] Filed: Dec. 2, 1994

[30] Foreign Application Priority Data

Dec. 7, 1993 [JP] Japan ................... 5-065267 U

[51] Int. Cl.$^6$ ........................................ H02P 7/00
[52] U.S. Cl. ..................... 318/439; 318/254; 318/696; 360/77.02
[58] Field of Search .................... 312/254, 439, 312/138, 485, 496, 452; 360/73.01, 73.03, 75, 77.02, 77.08, 77.11

[56] References Cited

U.S. PATENT DOCUMENTS

| | | | |
|---|---|---|---|
| 4,514,667 | 4/1985 | Sakmann et al. | 318/254 |
| 4,752,724 | 6/1988 | Radzwill et al. | 318/254 |
| 4,897,583 | 1/1990 | Rees | 318/254 |
| 5,206,567 | 4/1993 | Sakurai et al. | 318/439 X |
| 5,221,881 | 6/1993 | Cameron | 318/439 X |
| 5,233,275 | 8/1993 | Danino | 318/439 X |

*Primary Examiner*—Jonathan Wysocki
*Attorney, Agent, or Firm*—Andrus, Sceales, Starke & Sawall

[57] ABSTRACT

A pulse generating unit responds to a series of instruction pulses to generate a series of driving pulses which includes alternately occurring first driving pulses and second driving pulses. The pulse generating unit generates the first driving pulses directly in response to the series of instruction pulses. The pulse generating unit measures a predetermined delay time using a series of reference clock pulses since the unit received the first pulse of the series of instruction pulses. The pulse generating unit generates the second driving pulses after the thus measured predetermined delay time has elapsed. A motor requires an initial exciting period between a first one of the first driving pulses and a first one of the second driving pulses of the series of driving pulses, and requires a steady-state exciting period between each two adjacent pulses of the series of driving pulses. The predetermined delay time is longer than the initial exciting period. A time span between each two adjacent pulses of the series of instruction pulses is longer than a predetermined minimum instruction pulse period. A starting delay time is shorter than a time period obtained as a result of subtracting the steady-state exiting period and the predetermined delay time from the predetermined minimum instruction pulse period. The starting delay time is a time since a reference-clock generating unit started, which time is required for the magnitude of the series of reference clock pulses to reach an effective one.

5 Claims, 5 Drawing Sheets

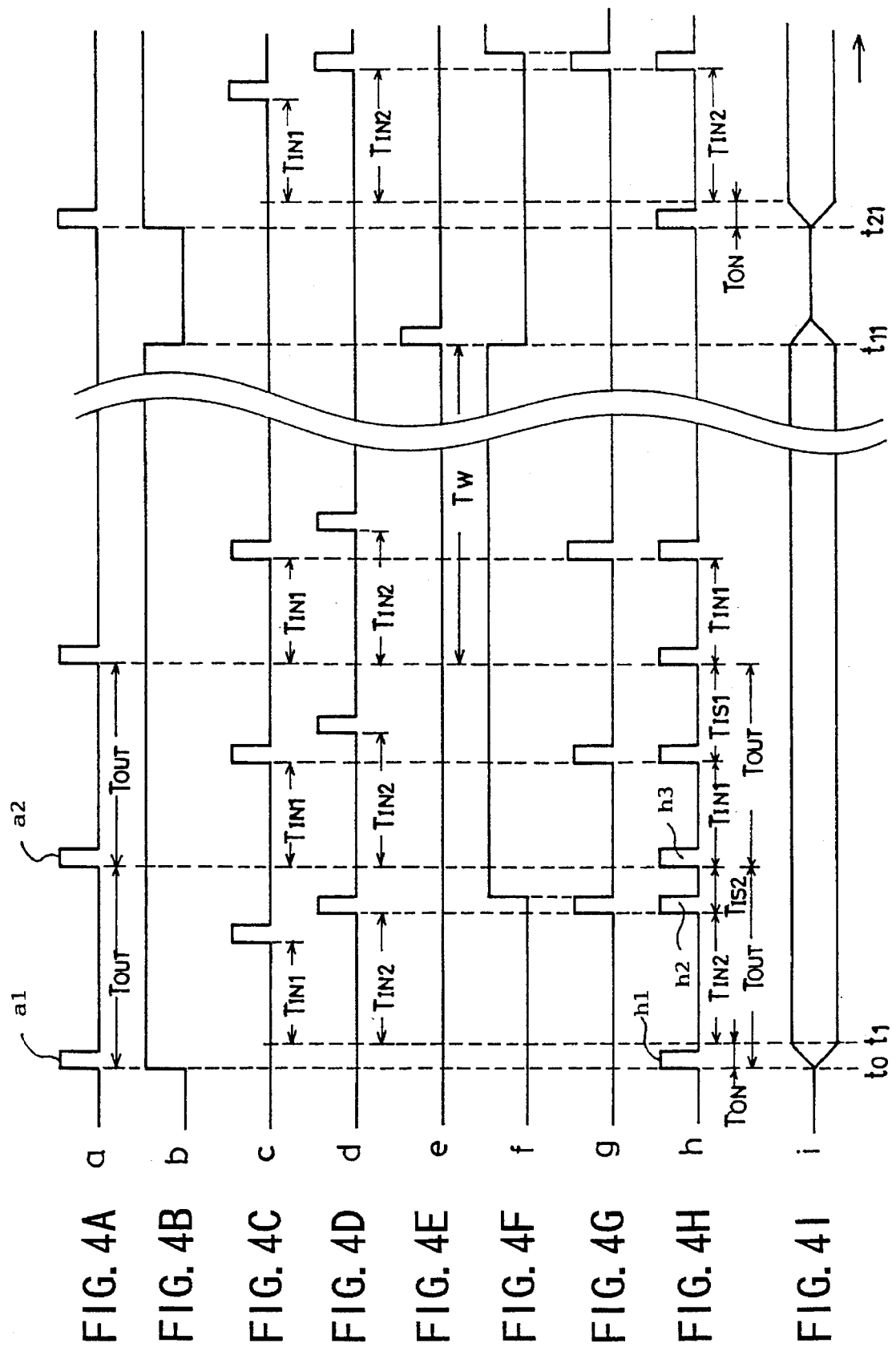

PULSE GENERATING SYSTEM RESPONDING TO INSTRUCTION PULSES FOR GENERATING DRIVING PULSES FOR DIVING MOTOR

BACKGROUND OF THE INVENTION

1. Field of the Invention

The present invention relates to a pulse generating system which responds to instruction pulses for generating driving pulses which drive a motor. The present invention is applicable to a circuit for driving and controlling the rotation of a stepper motor which is used in a magnetic-disk drive. In the magnetic-disk drive, the stepper motor moves a magnetic read/write head so as to position the head at a desired track of the magnetic disk.

2. Related Art

A step-pulse generating circuit acting as the pulse generating system in the related art used in the magnetic-disk drive controls the rotation of the stepper motor in the magnetic-disk drive. A series of external step pulses are input to the step-pulse generating circuit and using the series of external pulses, the step-pulse generating circuit generates a series of exciting step pulses. The term 'step' of the step pulse may have been derived from the use of the stepper motor. Each of the step pulses is a pulse be used to cause the stepper motor to move the magnetic read/write head through a disk actuator arm from one track to the next. The series of exciting step pulses are used to control the rotation of the stepper motor. Using the series of exciting step pulses, a stepper motor control circuit generates series of exciting pulses for each phase of the stepper motor and the thus generated series of exciting pulses for each phase are supplied to respective phase terminals of the stepper motor.

The step-pulse generating circuit has therein a reference-clock generating circuit for generating a series of reference clock pulses. A time span of the above-mentioned series of exciting step pulses is defined using the series of reference clock pulses. The thus-defined time span of the series of exciting step pulses corresponds to an exciting time of the stepper motor. The exciting time of the stepper motor is a time during which an exciting pulse of the series of exciting pulses excites relevant windings of the stepper motor, thus moving the stepper motor as a result of interaction between relevant magnets and the windings in the stepper motor.

Some of such magnetic-disk drives have a power-saving mode for reducing power consumption. Such a magnetic-disk drive with the power-saving mode enters into the power-saving mode if no instructions have been input from outside of the magnetic-disk drive thereto for a predetermined time period. In the power-saving mode, the magnetic-disk drive stops operations of parts/components therein which are not necessary during a time during which no instructions are input from outside of the magnetic-disk drive thereto. Thus, power consumption is reduced. Specifically, if no instructions are input from outside of the magnetic-disk drive, no external step pulses have been input to the step-pulse generating circuit. As a result, in the power-saving mode, the step-pulse generating circuit in the magnetic-disk drive stops an operation of generating the series of exciting step pulses.

However, the above-mentioned reference-clock generating circuit is kept in a state in which the reference clock pulses are still generated in the power-saving mode. As a result, if input of the series of external step pulses to the step-pulse generating circuit in the power-saving mode, the step-pulse generating circuit is started can immediately respond to the input of the series of external step pulses so as to generate the series of exciting step pulses without substantial time delay.

However, the reference-clock generating circuit consumes a relatively large amount of power for a pulse oscillation operation. Therefore, it is preferable to also stop the operation of the reference-clock generating circuit in the power-saving mode in order to improve the power saving effect.

With reference to FIG. 1A, a crystal oscillation circuit will be described. The crystal oscillation circuit consists of a quartz crystal resonator 56, an inverter circuit 57, a resistor $R_{53}$, and capacitors $C_{54}$, $C_{55}$. A series of pulses obtained by an oscillation operation performed by the oscillation circuit can be obtained from a point at which the inverter circuit 57, resistor $R_{53}$ and quartz crystal resonator 56 are connected with one another. Another inverter circuit 52 is connected between the above connecting point and an output terminal 72. Such a circuit construction has been well-known as a typical crystal oscillation circuit. Such a crystal oscillation circuit may be used as the above-mentioned reference-clock generating circuit in the related art. The reference-clock generating circuit is used in a condition in which stopping of the pulse oscillation (generating) operation is not necessary.

With reference to FIG. 1B, a type of the reference-clock generating circuit will be described. This type of the reference-clock generating circuit is obtained as a result of modifying the above-mentioned reference-clock generating circuit in the related art. In this type of the reference-clock generating circuit, the pulse generation operation can be stopped in the power-saving mode. In the reference-clock generating circuit shown in FIG. 1B, a NAND circuit 51 is used instead of the inverter circuit 57 used in the circuit shown in FIG. 1A. By the oscillation function of the crystal oscillation circuit using the quartz crystal resonator 56, the reference-clock generating circuit shown in FIG. 1 outputs the series of reference clock pulses via the output terminal 72.

In the power-saving mode, a signal is input to the reference-clock generating circuit at a control terminal 71 so that a level of the control terminal 71 becomes a low level. As a result, the oscillation operation in the circuit is stopped. If the relevant step-pulse generating circuit goes out of the power-saving mode, a signal is input to the reference-clock generating circuit at the control terminal 71 so that the level of the control terminal 71 is changed from the low level to a high level. As a result, the oscillation operation is started in the reference-clock generating circuit.

The reference-clock generating circuit shown in FIG. 1 has a starting time since the circuit has been started, which time is the time required for the oscillation state thereof to reach a steady state. If supply of the above-mentioned series of external step pulses is started in the power-saving mode, the reference-clock generating circuit then starts to generate the series of reference clock pulses. The relevant step-pulse generating circuit thus uses the thus-generated reference clock pulses so as to generate the above-mentioned series of exciting step pulses. Such a starting time as mentioned above may prevent the series of exciting step pulses from being obtained in a timely manner if a time span between each two adjacent pulses of the series of external step pulses is too short. In such a case, the rotation of the stepper motor may not be properly controlled through the step-pulse generating circuit.

SUMMARY OF THE INVENTION

An object of the present invention is to provide a pulse generating system such as the above-described step-pulse generating circuit to be used in the magnetic-disk drive. The pulse generating system to be provided has the power-saving mode and stops the operation of a relevant reference clock generating means such as the relevant reference-clock generating circuit in the power-saving mode. Thus, it is possible to reduce power consumption. Further, in the pulse generating system to be provided, the above-mentioned starting time of the reference-clock pulse means does not prevent the pulse generating system from timely supplying a series of driving pulses such as the series of exciting step pulses after supplying of a series of instructing pluses such as the series of external step pulses is started in the power-saving mode.

The pulse generating system according to the present invention comprises:

reference-clock generating means responding to a series of instruction pulses being received from outside and thus generating a series of reference clock pulses;

said reference-clock generating means has a starting delay time since said reference-clock pulse generating means has received a first pulse of said series of instruction pulses, which time is required for said reference-clock generating means to enter a state in which said reference-clock generating means generates an effective one of said series of reference clock pulses;

pulse generating means responding to said series of instruction pulses being received and thus generating a series of driving pulses, said series of driving pulses being used to drive a motor which is operated in response to said series of driving pulses being provided;

said series of driving pulses comprising alternately occurring first driving pulses and second driving pulses;

said pulse generating means generating said first driving pulses directly in response to said series of instruction pulses;

said pulse generating means measuring a predetermined delay time using said series of reference clock pulses after said starting delay time has elapsed since said pulse generating means received said first pulse of said series of instruction pulses, and said pulse generating means generating said second driving pulses after the thus measured predetermined delay time has elapsed;

and wherein:

said motor requires, when the rotation of said motor is started, an initial exciting period between a first one of said first driving pulses and a first one of said second driving pulses of said series of driving pulses;

said motor requires, after said first one of said first driving pulses and said first one of said second driving pulses have driven said motor, a steady-state exciting period between each two adjacent pulses of said series of driving pulses;

said predetermined delay time is longer than said initial exciting period;

a time span between each two adjacent pulses of said series of instruction pulses is longer than a predetermined minimum instruction pulse period;

said starting delay time is shorter than a time period obtained as a result of subtracting said steady-state exiting period and said predetermined delay time from said predetermined minimum instruction pulse period.

The above-mentioned motor is typically a stepper motor which rotates a same number of degrees each time for each pulse of the above-mentioned alternately occurring first and second driving pulses of the series of driving pulses. FIG. 4H shows the series of driving pulses in an embodiment of the present invention described later. Practically, a motor control circuit such as the stepper-motor control circuit responds to the series of driving pulses such as the above-mentioned exciting step pulses and thus supplies the exciting pulses to the motor to drive the motor as described above.

The time period of the series of driving pulses, that is, the time span between the first and second driving pulses (for example, h1 and h2 in FIG. 4H) and the time span between the second driving pulse (for example, h2) and subsequent first driving pulse (h3, in the example) should be longer than the above-mentioned steady-state exciting period which is determined depending on the performance of the relevant motor. The time span between each two adjacent pulses of the series of driving pulses corresponds to the above-mentioned exciting time. If the exciting time between two adjacent pulses (h2 and h3, in the above example) of the series of driving pulses is shorter than the steady-state exciting period, the motor may not rotate the above-mentioned same number of degrees for the first one of these two adjacent driving pulses.

Further, ordinarily, a torque required to initially rotate the motor is larger than a torque required to rotate the motor after the rotation of the motor has once started and reached a steady rotation state. However, even in a case where the motor is started, the motor has to rotate the above-mentioned same number of degrees during a time even between the first one (h1, in the above example) of the first driving pulses and the first one (h2, in the above example) of the second driving pulses. For this purpose, the initial exciting period may be longer than the steady-state exciting period. Such a longer exciting time can accordingly supply a larger torque to the motor in total during the longer exciting time. As a result of the longer initial exciting period being provided, the motor rotation which has been started due to the first one (h1) of the first driving pulses can substantially reach the steady rotation state before the first one (h2) of the second driving pulses is supplied after the initial exciting period since the first one of the first driving pulses was supplied has elapsed. The first one (h2) of the second driving pulses is a driving pulse which is to be supplied right subsequent to the first one (h1) of the first driving pulses.

The time span between each two adjacent pulses of the series of the instruction pulses (for example, shown in FIG. 4A) is determined to be longer than the predetermined minimum instruction pulse period as mentioned above. The pulse generating system has to supply the first and second driving pulses (h1 and h2, in the example) for a time span ($T_{OUT}$ shown in FIG. 4A, in the example) between each two adjacent pulses of the series of instruction pulses and the time span between each two adjacent pulses (for example, h1 and h2) of the series of driving pulses consisting of the first and second driving pulses has to be appropriately longer than either the above-mentioned steady-state exciting period or the initial exciting period as described above.

The pulse generating system enters into the power-saving mode if none of the series of instruction step pulses has been input to the pulse generating system. The pulse generating system stops the clock generating operation of the reference-clock generating means in the power-saving mode. The pulse generating system starts the clock generating operation of the reference clock generating means when supplying of the series of instruction step pulses is started (for example, from a pulse al shown in FIG. 4A). At the beginning of the clock generating operation, the pulse generating means can supply the first one (h1, in the example) of the first driving pulses immediately after the supplying of the series of the instruction pulses (shown in FIG. 4A, in the example) is started. Subsequently, after the supplying of the first one (h1) of the first driving pulses, the pulse generating means has to supply the first one (h2) of the second driving pulses. However, at the beginning of the clock generating operation, the above-mentioned starting delay time (for example, $T_{ON}$ shown in FIG. 4I) is required for the reference-clock generating means to supply an effective one of the series of reference clock pulses. After the effective one of the series of reference clock pulses is supplied, then the pulse generating means can measure the predetermined delay time ($T_{IN2}$ shown in FIG. 4H) and thus can supply the first one (h2) of the second driving pulses after measuring the predetermined delay time.

If the starting delay time of the reference clock generating means is long, a time period between the first one (h1) of the first driving pulses and the subsequently supplied first one (h2) of the second driving pulses becomes long accordingly. This is because this time period is a time period obtained as a result of adding the starting delay time to the predetermined delay time. As a result, a time period ($T_{IS2}$ shown in FIG. 4H) remaining, after the total time of the starting delay time and then the predetermined time has elapsed, is short. The remaining time period ($T_{IS2}$) is a time period obtained as a result of subtracting the starting delay time ($T_{ON}$) and the predetermined delay time ($T_{IN2}$) from the minimum instruction pulse period. In other words, the remaining time period elapses at a time at which the subsequent one (a2 shown in FIG. 4A) of the instruction driving pulses is supplied to the pulse generating system. As a result of the remaining time period being short, a time period between the first one (h2) of the second driving pulses and the second one (h3) of the first driving pulses is short. According to the present invention, as mentioned above, the starting delay time of the reference-clock generating means is shorter than the time period obtained as a result of subtracting the steady-state exiting period and the predetermined delay time from the predetermined minimum instruction pulse period. As a result, the time period between the first one (h2) of the second driving pulses and the second one (h3) of the first driving pulses is ensured to be longer than the above-mentioned steady-state exiting period. Accordingly, even when the motor is started, it is assured that the motor rotates the same numbers of degrees in accordance with timing of the series of instruction pulses being input to the pulse generating system.

Other objects and further features of the present invention will become more apparent from the following detailed description when read in conjunction with the accompanying drawings.

BRIEF DESCRIPTION OF THE DRAWINGS

FIGS. 4A, 4B, 4C, 4D, 4E, 4F, 4G, 4H and 4I show time charts of wave forms of signals at points in the step-pulse generating circuit shown in FIG. 2.

DESCRIPTION OF THE PREFERRED EMBODIMENT

Figure 2:
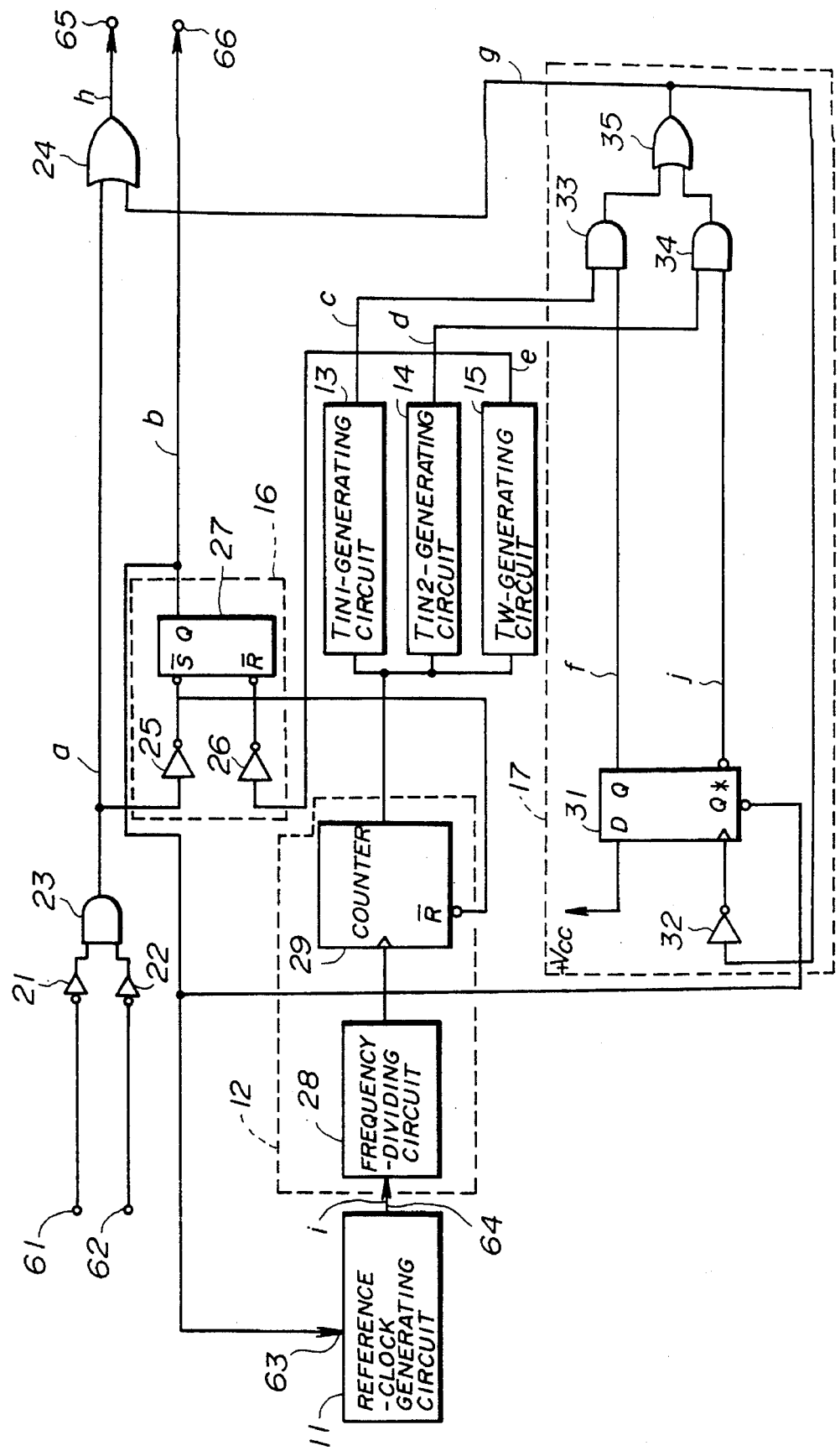
FIG. 2 shows the step-pulse generating circuit for magnetic-disk drive in one embodiment of the pulse generating system according to the present invention.

With reference to FIG. 2, a construction of the step-pulse generating circuit to be used in a magnetic-disk drive in one embodiment of a pulse generating system according to the present invention will now be described. A reference-clock generating circuit 11 generates a series of reference clock pulses having a fixed frequency. A counting circuit 12 includes a frequency-dividing circuit 28 and a counter 29. The frequency-dividing circuit 28 divides the frequency of the series of reference clock pulses so as to obtain a series of reference clock pulses having 1/N the original frequency. The counter 29 counts pulses of the thus obtained series of reference clock pulses. The counting circuit 12, a $T_{IN1}$-generating circuit 13 acting as a first inner step-pulse generating circuit, a $T_{IN2}$-generating circuit 14 acting as a second inner step-pulse generating circuit, and an inner step-pulse selecting circuit 17 constitute an inner step-pulse generating means. The inner step-pulse selecting circuit 17 includes a flip-flop 31, an inverter circuit 32, AND circuits 33 and 34, and an OR circuit 35.

The counting circuit 12, a $T_W$-generating circuit 15, and a control-signal generating circuit 16 constitute a start/stop control means. The control signal generating circuit 16 includes a flip-flop 27, and inverter circuits 25 and 26.

A drive-select signal having a negative logic is supplied to a terminal 61 and the series of external step pulses is supplied to a terminal 62. The drive-select signal has a low (L) level if the signal indicates that the relevant disk drive will be used and has a high (H) level if the signal indicates the contrary. Each pulse of the series of external step pulses to be supplied to the terminal 62 is at the L level and the terminal 62 is at the H level between occurrences of each two adjacent pulses of the series of external step pulses.

During a time the drive-select signal is at the L level, a gate circuit consisting of the inverter circuits 21 and 22 and AND circuit 23 supplies the series of external step pulses at an output terminal of the AND circuit 23 shown as a point 'a'. However, each pulse of the thus supplied series of external step pulses is at the H level and the point 'a' is at the L level between occurrences of each two adjacent pulses of the series of external step pulses. The series of external step pulses appearing at the point 'a' is shown in FIG. 4A.

The step-pulse generating circuit shown in FIG. 2 supplies the exciting step pulses at a terminal 66 and supplies a power-save canceling signal at a terminal 67. The power-save canceling signal is at the H level if the signal indicates that the relevant power-saving mode is removed. The series of exciting step pulses and power-save canceling signal are supplied to the stepper-motor control circuit.

Figure 3:
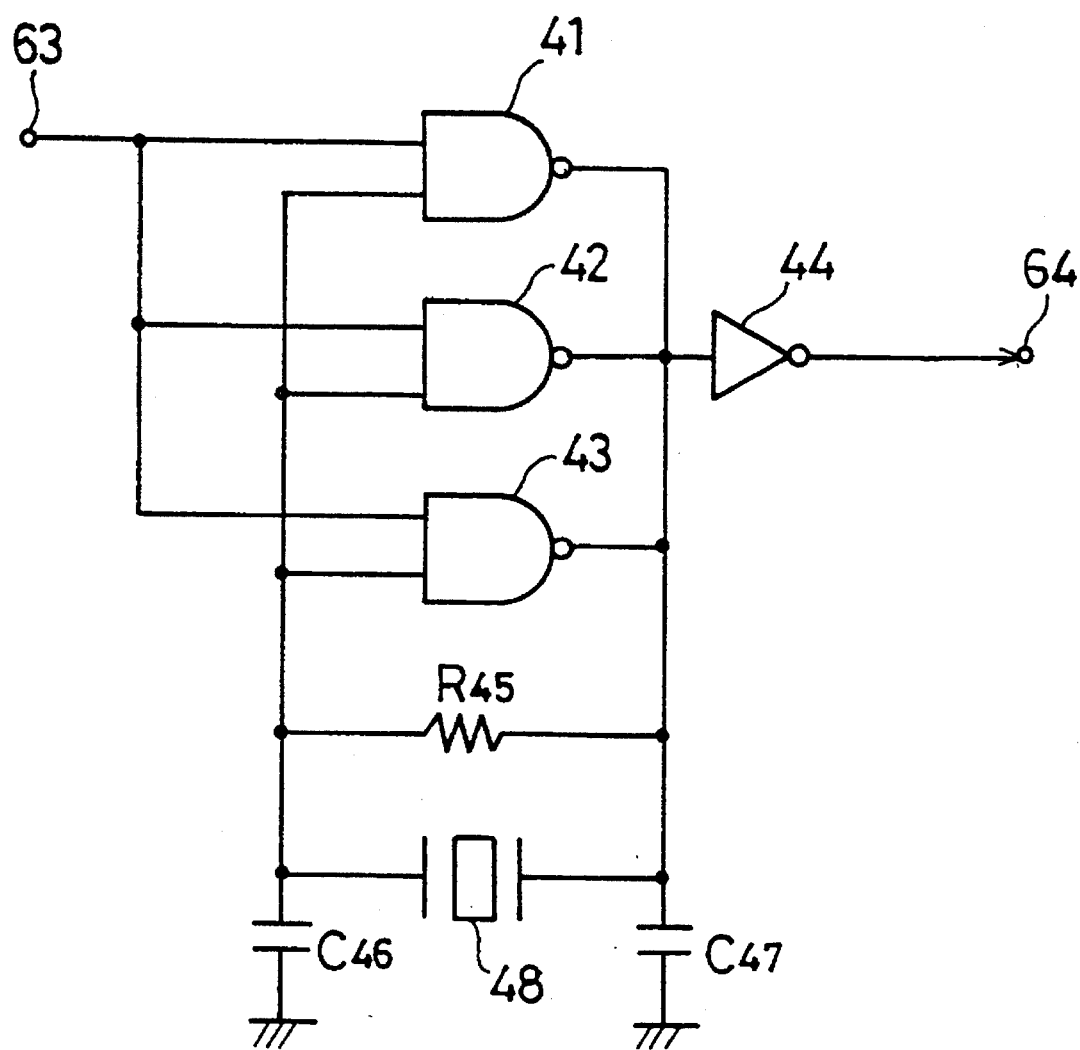
FIG.3 shows the crystal oscillation circuit in one embodiment of the reference-clock generating circuit of the step-pulse generating circuit shown in FIG. 2.

With reference to FIG. 3, one embodiment of the reference-clock generating circuit 11 will now be described. The reference-clock generating circuit 11 includes the crystal oscillation circuit in the embodiment. The reference-clock generating circuit 11 includes NAND circuits 41, 42 and 43, an inverter circuit 44, a resistor $R_{44}$, capacitors $C_{46}$ and $C_{47}$, and a quartz-crystal resonator 48. The reference-clock generating circuit 11 performs the oscillation operation if a control terminal 63 of the circuit 11 is at the H level. The reference-clock generating circuit 11 supplies the series of reference clock pulses at an output terminal 64 as a result of performing the oscillation operation. If the control terminal 63 is at the L level, the reference-clock generating circuit 11 does not perform the oscillation operation.

In detail, the reference-clock generating circuit 11 shown in FIG. 3 is one type of LC oscillator. Specifically, the circuit 11 is a variant of the well-known Colpitts oscillator. In the Colpitts oscillator, three impedance elements are connected to an amplifier and a positive feedback operation is performed at a frequency determined depending on impedance values of the impedance elements which constitute a resonance circuit. Two of the three impedance elements of the Colpitts oscillator consist of two capacitors and the remaining one consists of a coil (inductance element). A quartz crystal constituting the quartz-crystal resonator 48 has a property such that the crystal oscillates at a frequency within a very narrow band and also has a property as an inductive reactance. The above-mentioned coil in the Colpitts oscillator is replaced by the quart-crystal resonator such as the resonator 48. In the reference-clock generating circuit 11, the quartz-crystal resonator 48 acts as the coil in the Colpitts oscillator and the capacitors $C_{46}$ and $C_{47}$ act as the two capacitors therein. The resonator 48 acts as an element for performing the positive feedback operation for the amplifier and determines the oscillation frequency.

If the terminal 63 shown in FIG. 3 is at the L level, a first input terminal of each of the NAND circuits 41, 42 and 43 directly connected to the terminal 63 is at the L level accordingly. Therefore, the output terminal of each of the NAND circuits 41, 42 and 43 is at the H level whether a second input terminal thereof is at the H level or at the L level. As a result, no oscillation operation is performed. If the terminal 63 is at the H level, the NAND circuits 41, 42 and 43 substantially act as NOT circuits and a level at the output terminals thereof is fed back via the quartz-crystal resonator 48. If the output terminals of the NAND circuits 41, 42 and 43 are at the H level, the capacitor $C_{47}$ is charged and thus a voltage thereof increases. The thus-increasing voltage is transmitted to the capacitor $C_{46}$ via the resonator 48 and thus the capacitor $C_{46}$ is charged, a voltage thereof thus increasing. As a result of the voltage increase of the capacitor $C_{46}$, the voltage of the capacitor $C_{46}$ reaches a high fixed level. Then, the second input terminals of the NAND circuits 41, 42 and 43 (substantially acting as NOT circuits) thus come to be at the H level, the second input terminals being directly connected to the capacitor $C_{46}$. As a result, the output terminals of the NAND circuits come to be at the L level and the capacitor $C_{47}$ is discharged. The voltage of the capacitor $C_{47}$ thus decreases and the thus-decreasing voltage is transmitted to the capacitor $C_{46}$. The capacitor $C_{46}$ is thus discharged and the voltage thereof is decreased. As a result of the voltage decrease of the capacitor $C_{46}$, the voltage of the capacitor $C_{46}$ reaches a low fixed level. Then, the second input terminals of the NAND circuits 41, 42 and 43 (substantially acting as NOT circuits) thus come to be at the L level. As a result, the output terminals of the NAND circuits come to be at the H level. Such operation is repeated and thus the oscillation operation is performed. During the oscillation operation, an electric current flows through the quartz-crystal resonator 48 so that the voltage level at the output terminals of the NAND circuits 41, 42 and 43 is fed back to the second input terminals thereof. The above electric current increases as the oscillation frequency nears a natural oscillation frequency of the quartz-crystal resonator 48. Therefore, the reference-lock generating circuit 11 oscillates at the natural oscillation frequency of the quartz-crystal resonator 48.

A specific frequency of the series of reference clock pulses supplied by the above-described reference-clock generating circuit 11 is 4 MHz, for example Further, a specific number N by which the frequency-dividing circuit 28 divides the frequency of the series of the reference clock pulses supplied by the reference-clock generating circuit 11, is 128 in the example. As a result, that is, as a result of dividing 4 MHz by 128, the series of reference clock pulses having a frequency of 31.25 kHz is supplied to the counter 29 from the frequency-dividing circuit 28 in the example.

With reference to FIGS. 2, 3, and 4A–4H, an operation of the pulse generating circuit shown in FIG. 2 will now be described. FIGS. 4A, 4B, 4C, 4D, 4E, 4F, 4G, 4H and 4I show time charts of signal levels appearing at points a, b, c, d, e, f, g, h and i shown in FIG. 2. In the description, it is assumed that the drive-select signal is supplied such that the magnetic-disc drive including the relevant step-pulse generating circuit is selected and thus the terminal 61 is at the L level.

A time span between each two adjacent pulses of the series of external step pulses (signal 'a') shown in FIG. 4A is assumed not to be shorter than a period $T_{OUT}$, that is, the minimum period is $T_{OUT}$. The $T_{OUT}$ is, for example, 3 ms (milliseconds). The magnetic-disk drive rotates the stepper motor the same number of degrees if the drive has received one pulse of the series of external step pulses. The same-number-of-degree motor rotation causes the magnetic head to move one track of the magnetic disk. Practically, in order to improve the accuracy with which the magnetic head is positioned when it is moved, the magnetic-disk drive produces two steps of the series of exciting step pulses in response to each step of the series of external step pulses. The two steps of the series of exciting step pulses result in two-step rotation of the stepper motor. Thus, the magnetic-disk drive rotates the stepper motor by two steps in response to each step of the series of external step pulses being received.

Further, as described above, a driving torque required to initially rotate the stepper motor is larger than a driving torque required to rotate the motor in a state in which the motor is rotating after the motor has reached a steady rotation state after having being started. Driving-torque enlargement may be achieved either by enlarging the magnitude of the driving torque or by increasing the time the driving torque continues to be applied. Practically, the driving-torque enlargement is achieved by increasing the time the driving torque continues to be applied. That is, the initial exciting time, which is a time of a step for exciting the windings of the stepper motor at the beginning of the motor rotation, is increased.

The $T_{IN1}$-generating circuit 13 defines an internal step time $T_{IN1}$ which is a time of a step for exciting the windings of the stepper motor during a time in which the motor is in the steady rotation state. The $T_{IN2}$-generating circuit 14 defines an internal step time $T_{IN2}$ which is a time of a step for exciting the windings of the stepper motor at the beginning of the motor rotation. The latter internal step time $T_{IN2}$ corresponds to the above-mentioned increased initial exiting time. However, as will be described later, a time that the windings of the stepper motor is actually excited for initially is a time resulting from adding a time $T_{ON}$ to the internal step time $T_{IN2}$.

If no series of external step pulses are supplied to the magnetic-disk drive, the power-saving removing signal (signal 'b') shown in FIG. 4B is at the low (L) level and thus the reference-clock generating circuit 11 does not generate the series of reference clock pulses since the power-saving removing signal having the L level is supplied to a control terminal 63 of the circuit 11. In fact, as shown in FIG. 4I, before a time $t_0$, no series of the reference clock pulses (signal 'i') are generated. FIG. 4I shows an envelope line of a wave form of the series of the reference clock pulses.

As shown in FIG. 4A, the first one of the series of external step pulses is input at the time $t_0$. Thus, the flip-flop 27 in the control-signal generating circuit 16 is set to supply the power-saving removing signal having the high (H) level which indicates the magnetic-disk drive has left the power-saving mode. As a result, the reference-clock generating circuit 11 starts to generate the series of reference clock pulses. The series of the reference clock pulses then enter a steady state, that is, the magnitude thereof increases, as shown in FIG. 4I, to be an effective one at a time $t_1$ after the time $T_{ON}$ has elapsed from the starting time $t_0$.

The counter 29 counts pulses output from the frequency-dividing circuit 28. However, a signal, a logical level of which results from inverting the series of external step pulses as the signal 'a' through the inverter 25, is supplied to a reset terminal of the counter 29. As a result, the counter 29 of the counting circuit 12 is reset, that is, the count number of the counter 29 is forced to be '0' at a time when each pulse of the series of external step pulses has been input to the step-pulse generating circuit. After that, the count number of the counter 29 increases from 0 in response to each pulse being input from the frequency-dividing circuit 28.

Practically, the first pulse (a1 shown in FIG. 4A) of the series of external step pulses causes the reference-clock generating circuit 11 to start. The magnitude of the series of the reference clock pulses rises up and thus becomes the effective one after the time $t_1$ has elapsed. Then, the counter 29 starts the above-mentioned counting. The thus-obtained count number of the counter 29 is supplied to the $T_{IN1}$-generating circuit 13, $T_{IN2}$-generating circuit 14, and $T_W$-generating circuit 15.

A reference count number is previously set in the $T_{IN1}$-generating circuit 13, the reference count number corresponding to the time $T_{IN1}$. The count number of the counter 29 reaches the reference count number corresponding to $T_{IN1}$ after the time $T_{IN1}$ has elapsed from the time $t_1$ at which the counter 29 started the counting. At this time, the $T_{IN1}$-generating circuit 13 thus generates an internal step pulse shown in FIG. 4C as a signal 'c'. The internal step pulse has a fixed time span during which the H level is maintained. Similarly, as shown in FIG. 4C, the $T_{IN1}$-generating circuit 13 generates the identical internal step pulse after the time $T_{IN1}$ has elapsed since the count number of the counter 29 was reset as a result of each pulse of the series of external step pulses being input subsequent to the first pulse a1.

Further, a reference count number is previously set in the $T_{IN2}$-generating circuit 14, the reference count number corresponding to the time $T_{IN2}$. The count number of the counter 29 reaches the reference count number corresponding to $T_{IN2}$ after the time $T_{IN2}$ has elapsed from the time $t_1$ at which the counter 29 started the counting. At this time, the $T_{IN2}$-generating circuit 14 thus generates an internal step pulse shown in FIG. 4D as a signal d. The internal step pulse has a fixed time span during which the H level is maintained. Similarly, as shown in FIG. 4D, the $T_{IN2}$-generating circuit 14 generates the identical internal step pulse after the time $T_{IN2}$ has elapsed since the count number of the counter 29 was reset as a result of each pulse of the series of external step pulses being input subsequent to the first pulse a1.

If the external step time $T_{OUT}$ of the series of external step pulses shown in FIG. 4A is 3 ms as mentioned above, it is assumed that the above-mentioned time $TIN_1$ is 1.6 ms and $T_{IN2}$ is 2.0 ms. The internal step pulse of the signal 'c' and that of the signal 'd' are input to one input terminal of the AND circuit 33 and one input terminal of the AND circuit 34 of the internal step-pulse selecting circuit 17, respectively.

The flip-flop 31 of the internal step-pulse selecting circuit 17 was reset by the signal 'b' at the time the power-saving removing signal was at the L level. Thus, a signal 'f' (shown in FIG. 4F) at a Q output terminal is at the L level and a signal 'j' at a Q* output terminal is at the H level, the Q* output terminal having a logical value inverted from that of the Q output terminal. Since the signal 'j' having the H level is supplied to the AND circuit 34, the internal step pulse of the signal 'd' (supplied by the $T_{IN2}$-generating circuit 14) is passed through the AND circuit 34 and is then output as a signal 'g' (shown in FIG. 4G) via the OR circuit 35. Thus, the internal time $T_{IN2}$ is selected for the first one (a1) of the series of external step pulses.

As a result of the internal step pulse being supplied as the signal 'g' as mentioned above, the decaying of this step pulse causes a clock pulse to be supplied to the flip-flop 31 of the internal step-pulse selecting circuit 17 via the inverter circuit 32. Thus, the flip-flop 31 is set. As a result, the signal 'f' at the Q output terminal comes to be at the H level and the signal 'j' at the Q* output terminal comes to be at the L level. Since the signal 'f' having the H level is supplied to the AND circuit 33, the internal step pulse of the signal 'c' (supplied by the $T_{IN1}$-generating circuit 14) is passed through the AND circuit 34 and is then output as a signal 'g' via the OR circuit 35. Thus, the internal time $T_{IN1}$ is selected for the second external pulse a2 (shown in FIG. 4A) of the series of external step pulses. Similarly, until the magnetic-disk drive enters into the power-saving mode at a time $t_{11}$ shown in FIG. 4B, the internal time $T_{IN1}$ is selected for those external step pulses of the series of external step pulses subsequent to the second pulse a2.

Thus, a pulse of the internal step pulses as the signal 'g' for the first pulse a1 of the series of external step pulses has a time delay of the time resulting from adding the time $T_{ON}$ to the time $T_{IN2}$ from the time that the first pulse a1 of the series of external step pulses was input. Further, each pulse of the internal step pulses as the signal 'g' for respective pulses (starting from the pulse a2 shown in FIG. 4A) of the series of external step pulses subsequent to the above-mentioned first a1 pulse has a time delay of the time $T_{IN1}$ from the time that a respective pulse of the pulses of the series of external step pulses was input. It is noted that the first pulse a1 of the series of external step pulses is a pulse which is first input in the power-saving mode, which input results in the magnetic disk drive leaving the power-saving mode.

The OR circuit 24 performs the OR operation on the internal step pulses as the signal 'g' and the external step pulses as the signal 'a'. As a result, the OR circuit 24 supplies the result of the OR operation as the exciting step pulses as a signal 'h' shown in FIG. 4H.

The $T_W$-generating circuit 15 causes the magnetic-disk drive to enter the power-saving mode if no pulse of the series of external step pulses is input to the magnetic-disk drive for a fixed time period $T_W$. For this purpose, the $T_W$-generating circuit 15 causes the power-saving removing signal 'b' to be at the L level. A reference count number is previously set in the $T_W$-generating circuit 15, the reference count number corresponding to the time $T_W$. The time $T_W$ is predetermined to be a time resulting from multiplying several times the above-mentioned minimum period $T_{OUT}$ of the series of external step pulses. If the $T_{OUT}$ is 3 ms as mentioned above, the $T_W$ is predetermined to be, for example, 15 ms.

As mentioned above, the count number of the counter 29 is reset when each pulse of the series of external step pulses is input. If a pulse of the series of external step pulses is input subsequent to a preceding pulse after a time less than the time $T_W$ has elapsed since the preceding pulse was input, the count number of the counter 29 is reset as mentioned above. Thus, the count number of the counter 29 supplied to the $T_W$-generating circuit 15 does not reach the reference count number corresponding to the time $T_W$. However, if a pulse of the series of external step pulses is not input subsequent to a preceding pulse after the time $T_W$ has elapsed since the preceding pulse was input, the count number of the counter 29 supplied to the $T_W$-generating circuit 15 reaches the reference count number corresponding to the time $T_W$ at a time $t_{11}$ shown in FIG. 4E. Thus, the $T_W$-generating circuit 15 supplies a pulse as a power-saving signal 'h' having a fixed time span during which the H level is maintained.

The power-saving signal 'h' is supplied to a reset terminal of the flip-flop 27 via the inverter circuit 26 of the control-signal generating circuit 16. Thus, the flip-flop 27 is reset and thus the power-saving removing signal 'b' supplied from the Q output terminal of the flip-flop 27 comes to be at the L level. Thus, the magnetic-disk drive enters into the power-saving mode. When the level of the power-saving removing signal 'b' comes to be at the L level at the time $t_{11}$, since the signal 'b' is also supplied to the reference-clock generating circuit 11 at the control terminal 63, the reference-clock generating circuit 11 stops the oscillation operation and thus stops the pulse generation due to the L level of the signal 'b' at the control terminal 63.

Then, if the first pulse of the series of external step pulses is again input at a time $t_{21}$ as shown in FIG. 4A, an operation similar to that described above is started.

As shown in FIGS. 4A and 4H, two pulses of the series of exciting step pulses as the signal 'h', that is, two steps of the series of exciting step pulses, correspond to one pulse of the series of external step pulses as the signal 'a', that is a single step of the series of external step pulses. The single step of the series of external step pulses has the time $T_{OUT}$ in the example shown in FIG. 4A. The first step of the above-mentioned two steps of the exciting step pulses has the time $T_{ON}+T_{IN2}$ for the first pulse (for example, a1) of the series of external step pulses and has the time $T_{IN1}$ for each pulse of the series of the external step pulses subsequent to that first pulse. The second step of the above-mentioned two steps of the exciting step pulses has the time $T_{IS2}=T_{OUT}-T_{IN2}-T_{ON}$ for the first pulse of the series of external step pulses and has the time $T_{IS1}=T_{OUT}-T_{IN1}$ for each pulse of the series of the external step pulses subsequent to that first pulse.

The thus-obtained series of exciting step pulses as the signal 'h' at a terminal 65 is supplied to the stepper-motor control circuit. The stepper motor control circuit produces the series of exciting pulses for each phase of the stepper motor using the series of exciting step pulses and thus appropriately drives the stepper motor.

The above-mentioned time $T_{IS2}$ (internal step time) shown in FIG. 4H is the shortest time among the above-mentioned times (internal step times) $T_{ON}+T_{IN2}$, $T_{IN1}$, and $T_{IS1}$ shown in FIG. 4H, since the time $T_{IS2}$ is obtained as a result of subtracting, from the external step time $T_{OUT}$, the starting time (starting delay time) $T_{ON}$ and the internal step time $T_{IN2}$ which is longer than the internal step time $TIN_1$. The time $T_{IS2}$ is a time corresponding to the above-mentioned second step of the series of exciting step pulses for the first pulse of the external step pulses.

Ordinarily, the stepper motor has an allowable minimum step time $T_{IMIN}$ (steady-state exciting period). If the windings of the stepper motor are excited for the allowable minimum step time $T_{IMIN}$, the stepper motor can rotate the same number of degrees predetermined for each step. However, if the windings of the stepper motor are excited for a time less than the allowable minimum step time $T_{IMIN}$, the stepper motor may not rotate that same number of degrees. Therefore, the above-mentioned internal step time $T_{IS2}$ should be such that $$T_{IS2} \geq T_{IMIN} \qquad (1).$$

Further, $T_{IS2}=T_{OUT}-T_{IN2}-T_{ON}$. Therefore, $$T_{IS2}=T_{OUT}-T_{IN2}-T_{ON} \geq T_{IMIN}.$$

As a result, $$T_{ON} \leq T_{OUT}-T_{IN2}-T_{IMIN} \qquad (2).$$

Thus, a condition shown in the above expression (2) should be fulfilled for the stepper motor to rotate the same number of degrees by the above-mentioned second step of the series of exciting step pulses.

If a general example is assumed such that the external step time $T_{OUT}$=3.0 ms, the internal step time $T_{IN2}$=2.0 ms, and the allowable minimum step time $T_{IMIN}$=0.5 ms, the starting time $T_{ON}$ should be such that $T_{ON} \leq 0.5$ ms.

Figure 1A:
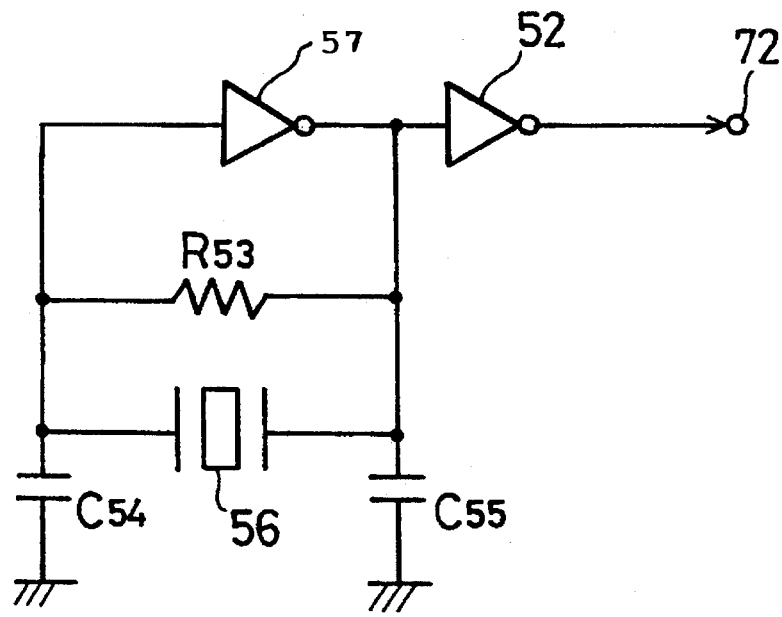
FIG. 1A shows the crystal oscillation circuit in the related art.
Figure 1B:
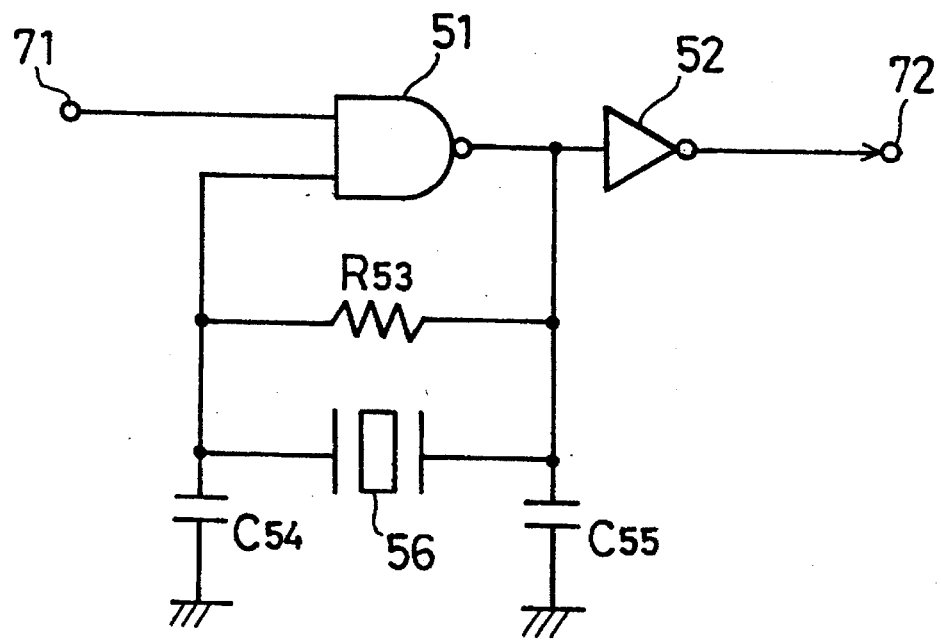
FIG. 1B shows the crystal oscillation circuit obtained as a result of modifying the circuit shown in FIG. 1A.
Figure 5B:
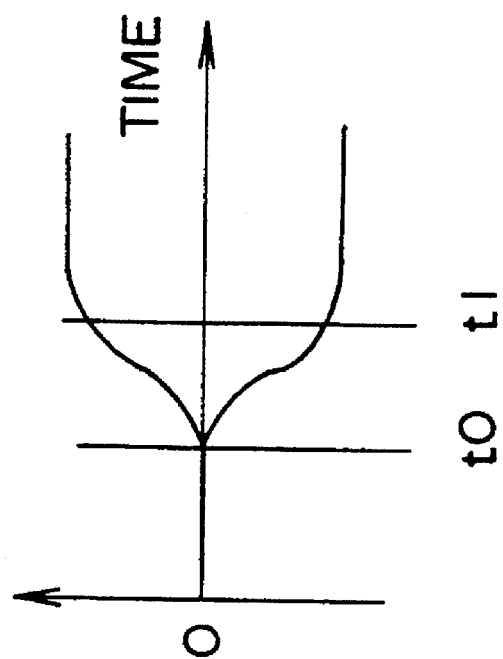
FIGS. 5A and 5B show envelopes of reference clock pulses at beginning of oscillation thereof.
Figure 5A:
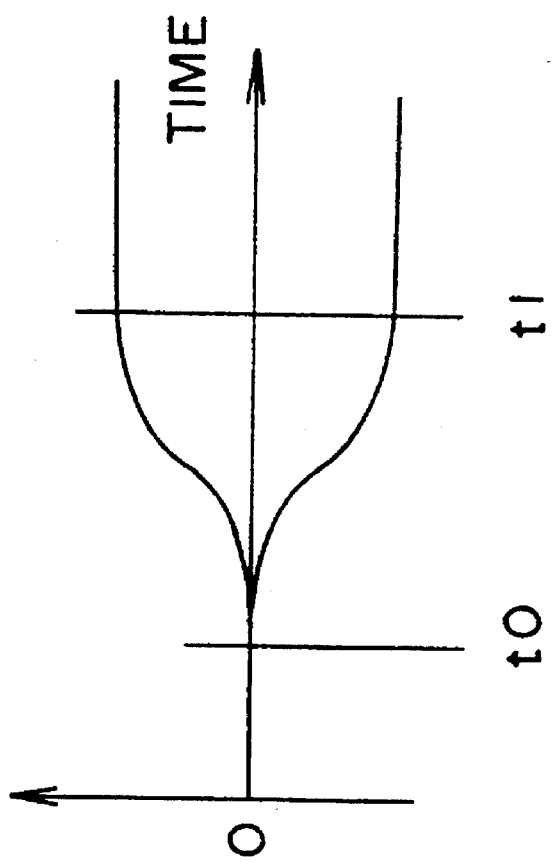

The reference-clock generating circuit shown in FIG. 3 is advantageous for reducing the starting time $T_{ON}$ in comparison to that shown in FIG. 1B. That is, three NAND circuits 41, 42 and 43 are connected in parallel with one another and thus an electric-current supply capability of the parallel NAND circuit 41, 42 and 43 is high. Through the thus-increased number of the NAND circuits, voltage difference between the H level and L level alternately appearing at the second input terminals of the NAND circuits 41, 42 and 43 as described above at the beginning of the oscillation operation is effectively amplified so that the thus-amplified voltage difference appears at the output terminals of the NAND circuits 41, 42 and 43. Therefore, it is possible to increase the magnitude of the series of reference clock pulses to an effective one quickly and thus to reduce the starting time $T_{ON}$ (between t0 and t1 shown in FIG.5A and 5B) as illustrated in FIGS. 5A and 5B. That is, by using the circuit construction shown in FIG. 3, it is easy to obtain a $T_{ON}$ of approximately 0.3 ms. FIG. 5A illustrates the state in which the oscillation operation is started in either the circuit shown in FIG. 1A or the circuit shown in FIG. 1B. FIG. 5B illustrates the state in which the oscillation operation is started in the reference-clock generating circuits 11 shown in FIG. 3. As shown in FIGS. 5A and 5B, the starting time $T_{ON}$ between t0 and t1 in FIG. 5B is shorter than that in FIG. 5A. In FIGS. 5A and 5B, the time t0 is a time at which the control terminal 63 of the reference-clock generating circuit 11 is changed from the L level to the H level. The time t1 is a time at which the voltage level at the output terminal 64 reaches 90% of a level of the terminal 64 at a time the generating circuit 11 is at a steady oscillation state thereof.

If the $T_{ON}$ can be sufficiently reduced as described above, it is possible to ensure a amount of the internal step time $T_{IS2}$ sufficient for the stepper motor to rotate the same number of degrees when the magnetic-disk drive exits from the power-saving mode in which the reference-clock generating circuit 11 stops the oscillation operation.

Thus, in the step-pulse generating circuit in the embodiment of the present invention, power consumption can be reduced by stopping the oscillation operation of the reference-clock generating circuit 11 during the power-saving mode. Further, it is also possible to supply the series of exciting step pulses which have the time spans such that each pulse of the series of exciting step pulses can rotate the stepper motor the same number of degrees even when the magnetic-disk drive exits from the power-saving mode.

The three NAND circuits 41, 42 and 43 increase power consumption in the reference-clock generating circuit shown in FIG. 3 during the oscillation operation being performed there, in comparison to the single NAND circuit 51 in the reference-clock generating circuit shown in FIG. 1B. However, in general, the time the magnetic-disk drive operates during which time the reference-clock generating circuit 11 performs the oscillation operation is very short in comparison to the time the magnetic-disk drive is in the power-saving mode during which time the reference-clock generating circuit is not performing the oscillation operation. Therefore, some increase of the power consumption occurring during the operation of the magnetic-disk drive may not significantly affect a large power saving achieved as a result of stopping the oscillation operation of the reference-clock generating circuit 11 during the power-saving mode.

Further, the present invention is not limited to the above-described embodiments, and variations and modifications may be made without departing from the scope of the present invention.

What is claimed is:

1. A pulse generating system comprising:

reference-clock generating means responding to a series of instruction pulses being received from outside and thus generating a series of reference clock pulses;

said reference-clock generating means having a starting delay time after said reference-clock pulse generating means has received a first pulse of said series of instruction pulses, which time is required for said reference clock generating means to enter a state in which said reference-clock generating means generates an effective one of said series of reference clock pulses;

pulse generating means responding to said series of instruction pulses being received and thus generating a series of driving pulses, said series of driving pulses being used to drive a motor which is operated in response to said series of driving pulses being provided;

said series of driving pulses comprising alternately occurring first driving pulses and second driving pulses;

said pulse generating means generating said first driving pulses directly in response to said series of instruction pulses;

said pulse generating means measuring a predetermined delay time using said series of reference clock pulses after said starting delay time has elapsed since said pulse generating means received said first pulse of said series of instruction pulses, and said pulse generating means generating said second driving pulses after the thus measured predetermined delay time has elapsed;

and wherein:

said motor requires, when the rotation of said motor is started, an initial exciting period between a first one of said first driving pulses and a first one of said second driving pulses of said series of driving pulses;

said motor requires, after said first one of said first driving pulses and said first one of said second driving pulses have driven said motor, a steady-state exciting period between each two adjacent pulses of said series of driving pulses;

said predetermined delay time is longer than said initial exciting period;

a time span between each two adjacent pulses of said series of instruction pulses is longer than a predetermined minimum instruction pulse period, and said starting delay time is shorter than a time period obtained as a result of subtracting said steady-state exiting period and said predetermined delay time from said predetermined minimum instruction pulse period.

2. The pulse generating system according to claim 1, wherein:

said motor comprises a stepper motor;

said series of driving pulses are used so that windings of said stepper motor are excited for a time between each two adjacent pulses of said series of driving pulses and thus said stepper motor rotates a same number of degrees for each excitation time.

3. The pulse generating system according to claim 1, further comprising power-saving means for causing said reference-clock generating means to stop generating the reference clock pulses if no pulse of said series of instruction pulses is input to said pulse generating system for a predetermined time.

4. The pulse generating system according to claim 1, wherein said motor is used to move a magnetic head of a magnetic-disk drive.

5. The pulse generating system according to claim 1, wherein:

said pulse generating means comprises:

a counting circuit for counting pulses of said series of reference clock pulses after each pulse of said series of instruction pulses is input, said counting circuit supplying a count number obtained as a result of counting said pulses of said series of reference clock pulses;

a first internal-pulse generating circuit for generating a first internal pulse when said count number supplied by said counting circuit reaches a first predetermined count number;

a second internal-pulse generating circuit for generating a second internal pulse when said count number supplied by said counting circuit reaches a second predetermined count number greater than said first predetermined count number; and a pulse selecting circuit for selecting said second internal pulse for said first pulse of said series of instruction pulses and selecting said first internal pulse for each pulse of said series of instruction pulses subsequent to said first pulse of said series of instruction pulses.

* * * * *

UNITED STATES PATENT AND TRADEMARK OFFICE
CERTIFICATE OF CORRECTION

PATENT NO. : 5,550,447
DATED : August 27, 1996
INVENTOR(S) : Sugeta et al

It is certified that error appears in the above-indentified patent and that said Letters Patent is hereby corrected as shown below:

IN THE TITLE: Title page, item [54] and col. 1, line 4,

Delete "DIVING" and substitute therefor ---DRIVING---

Claim 1, Col. 13, Line 47, delete "thus"

Signed and Sealed this

Twenty-eighth Day of January, 1997

Attest:

BRUCE LEHMAN

Attesting Officer    Commissioner of Patents and Trademarks